Figure 3:
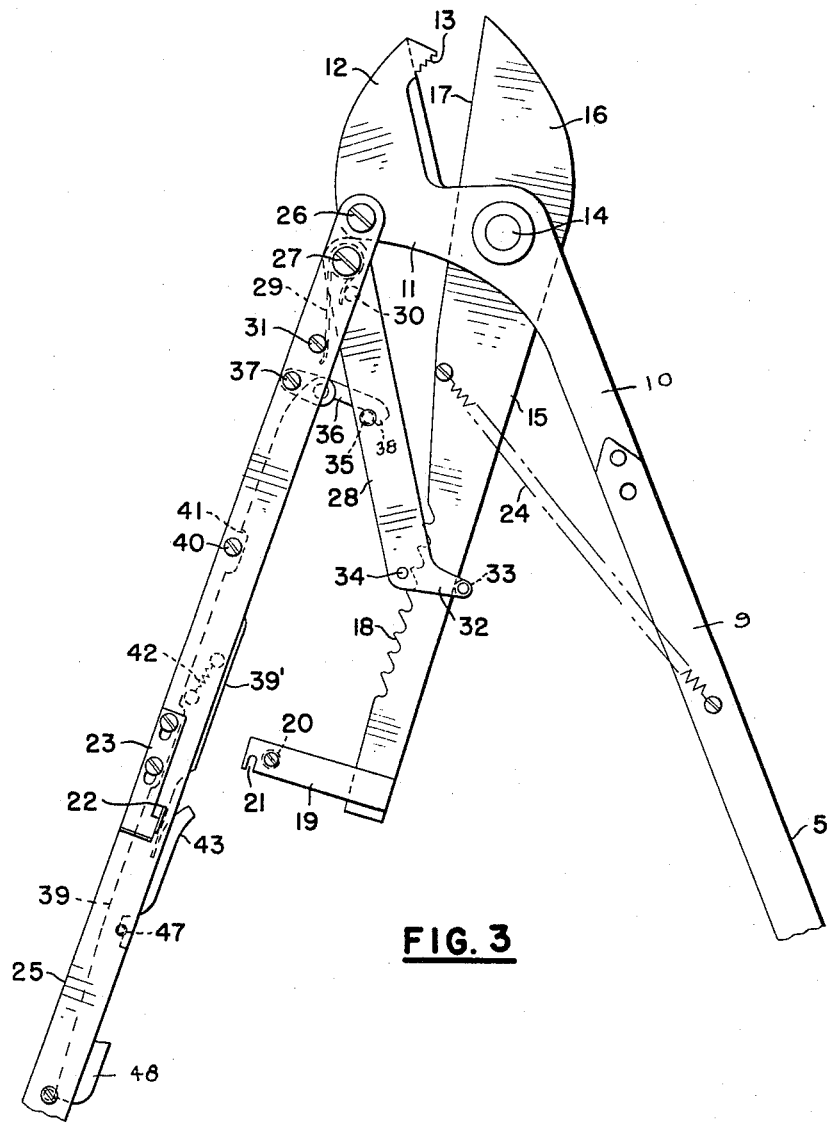

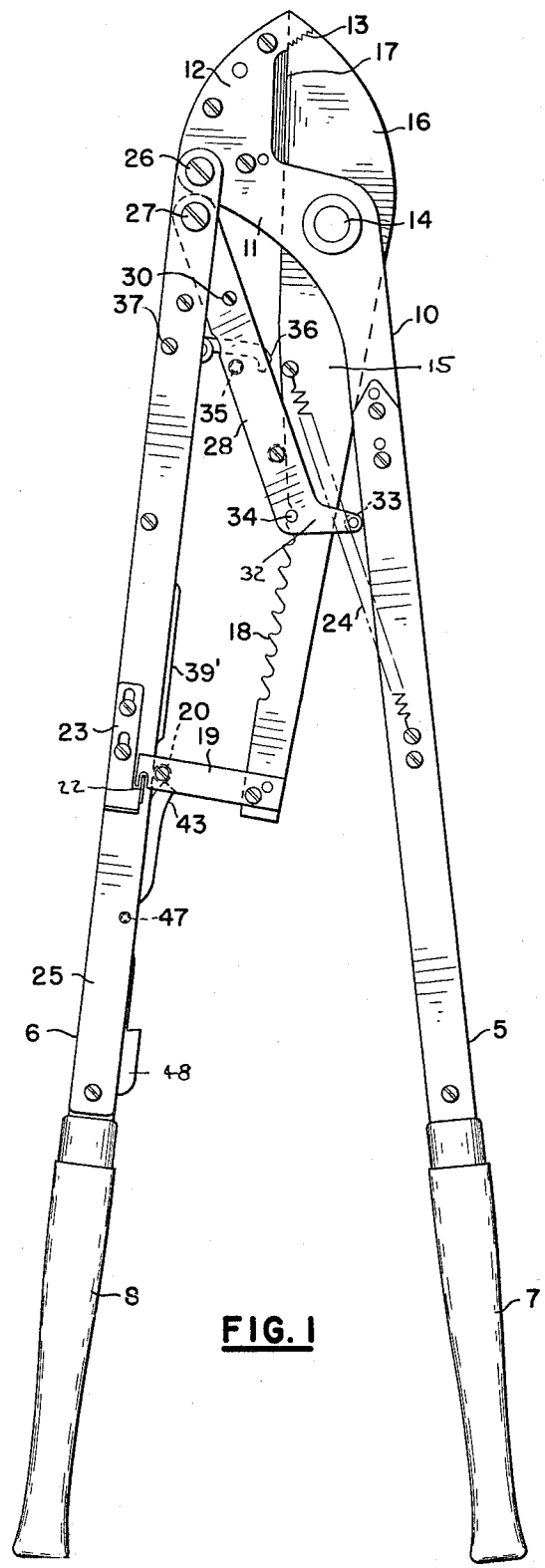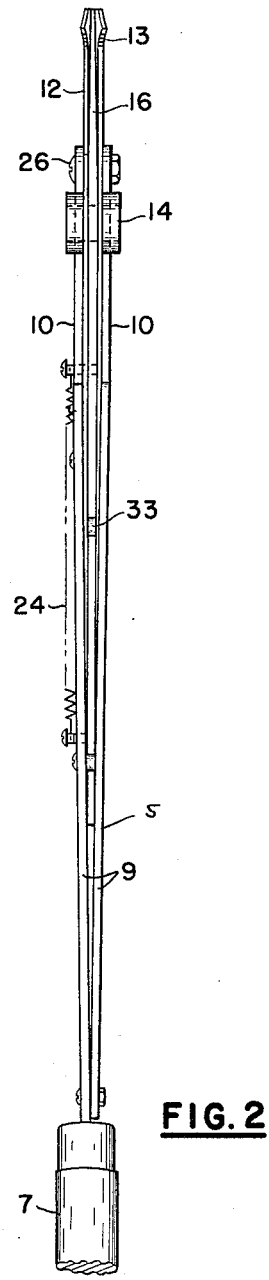
FIG. 1
FIG. 2
INVENTOR.
STEUART R. FLORIAN
BY
ATTORNEY

Sept. 20, 1966  S. R. FLORIAN  3,273,240
CUTTING TOOL
Filed May 11, 1964  3 Sheets-Sheet 3
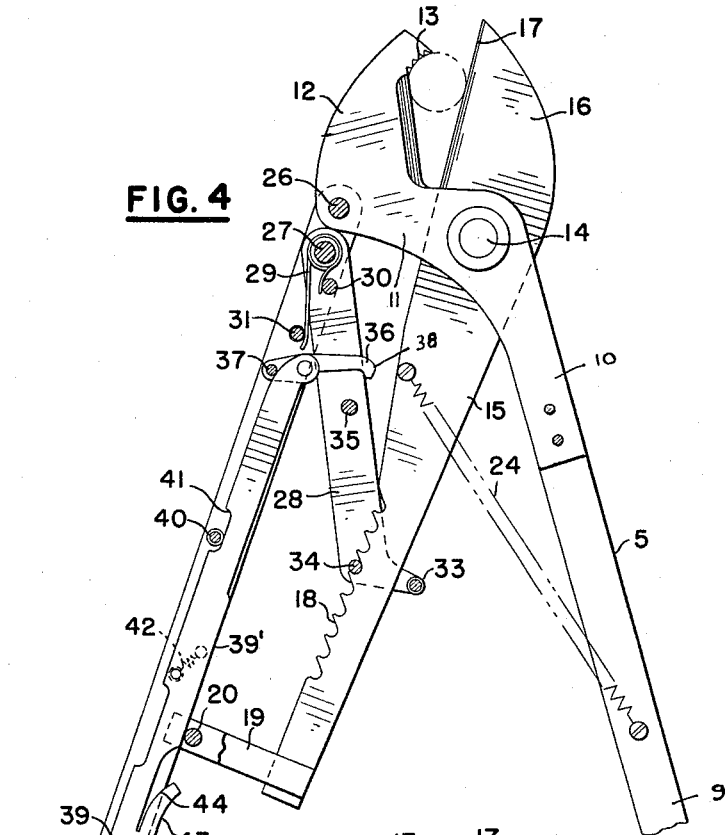
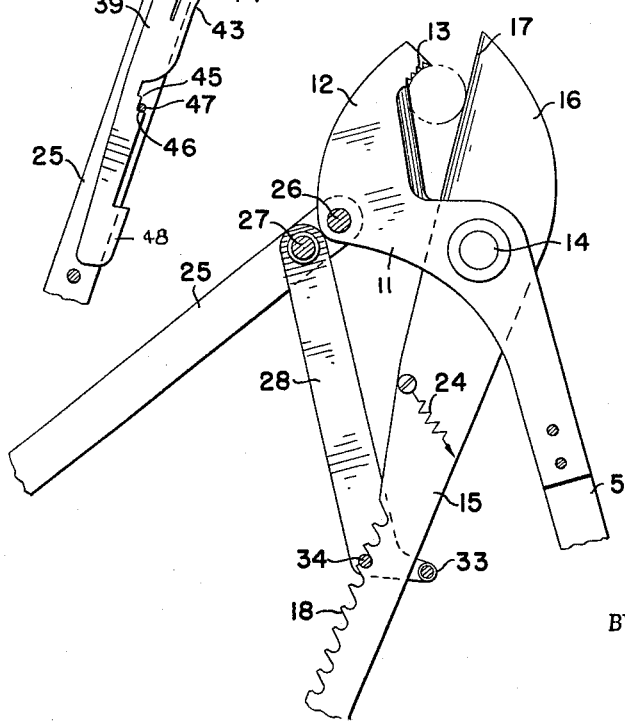
INVENTOR.
STEUART R. FLORIAN
BY
*James V. Cyle*
ATTORNEY

United States Patent Office 3,273,240
Patented Sept. 20, 1966

3,273,240
CUTTING TOOL
Steuart R. Florian, 1551 Griffin Road, P.O. Box 682,
Dania, Fla.
Filed May 11, 1964, Ser. No. 366,564
4 Claims. (Cl. 30—251)

This invention relates to a cutting tool and particularly a power tool for pruning hedges, other relatively heavy growth and to also function to cut through relatively heavy limbs on a tree.

The invention embodies a pair of relatively long handle sections that are provided at their lower ends with non-metallic ferrules to facilitate the movement of the handles together as in a cutting action.

One handle member is pivotally connected to a jaw carrying member and the handle is offset from its pivotal point outwardly to terminate in a cutting jaw, that co-operates with a jaw formed on the jaw carrying member and with the other handle also being pivotally connected to the offset jaw of the first handle member and having pivoted thereto a pawl that is adapted to straddle and engage ratchet teeth carried by the jaw carrying member whereby the handles and the jaws in the cutting position are progressively imparting a ratchet feed to the jaw carrying member to effectively cut the limb of a tree and with the jaw carrying member being biased toward the first handle by a spring.

The invention further contemplates a latch means carried by the second handle and with the latch means embodying a flat bar that is disposed upon the second handle and that functions to retain the device in a non-operative position and with a cooperative latch device carried at the lower end of the jaw carrying member that is notched to engage the latch bar on the second handle and a sliding latch upon the second handle that engages the latch device to hold the jaw carrying member in an inoperative position and against the tension of the spring and also latch means carried by the upper end of the latch bar for latching the pawl away from the ratchet.

The invention further includes handle members that are formed of spaced apart bars and with a latch bar disposed between the bars of one handle and biased upwardly by a spring, one handle having its plates extended laterally and upwardly to form a cutting area for cooperative engagement with a cutting bar having a cutting edge and that is disposed between the plates of said handle and pivoted thereto so that the cutting bar and its beveled cutting edge operates against the cutting socket carried by the handle, the second handle having its plates overlying and pivoted to the offset cutting head of the opposite handle, the cutting bar being extended downwardly and provided with a plurality of ratchet teeth and a pawl also formed of a pair of spaced apart plates that are pivoted to the second handle adjacent to the pivotal point of the plates upon the head and spring means for biasing the pawl toward the ratchet teeth so as to provide a progressively greater cutting action to the device and a latch device for movement into and out of engagement with a pin carried by the pawl to effectively lock the pawl in a position of disengagement with the ratchet. The second handle having an elongated control bar mounted between its plates and with the latch bar having a projecting control head at its lower end for movement or rocking motion of the latch bar to control the latch for the pawl and with the latch bar being biased upwardly by a spring and additional notches in the latch bar that have engagement with retaining pins and with a yoke carried by the cutter bar at its lower end and with the yoke having a cross pin that engages a notch and also, one arm of the yoke being provided with a downwardly opening notch that receives a slidable retainer to hold the mechanism in the inoperative position.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

FIGURE 1 is a side elevation of a cutting tool shown in the inoperative and latched position, FIGURE 2 is an edge view thereof looking at the right hand side of FIGURE 1, FIGURE 3 is a fragmentary side elevation of the cutting tool with the handles swung outwardly to move the jaws apart and with a pawl being held away from the ratchet teeth, FIGURE 4 is a fragmentary side elevation, parts being broken away and parts being shown in section illustrating the jaws in biting engagement with an article to be cut and with the pall being released to engage the ratchet teeth, and FIGURE 5 is a view similar to FIGURE 4 and with parts omitted to more clearly illustrate the feed of the pall upon the ratchet teeth and to more clearly illustrate the fulcrum action of the device.

Referring specifically to the drawings, there has been illustrated a cutting tool having handles 5 and 6. The handles at their lower ends are provided with wood ferrules 7 and 8. The handle 5 comprises a pair of flat bars 9 that are fixedly united upon a pair of spaced apart arms 10, forming a bifurcated head 11. The head 11 is offset from the arms 10 and with a spacer plate, jointly form a cooperative jaw 12. The jaws 12 at their upper ends are serrated or toothed, as indicated at 13, to prevent slippage of a tree limb or the like that is disposed there-against and during a cutting action. The head 11 is pivotally connected at 14 to a cutter and fulcrum bar 15 and the cutter bar 15 upwardly from the pivot 14 is provided with a flat head 16, sharpened at its inner edge to form cutting jaw 17. The cutter bar 15 is downwardly reduced in width and is provided with a series of ratchet teeth 18. Welded or otherwise fixed to the lower end of the cutter bar 15 is a yoke 19, that extends in the direction toward the opposite handle 6. The yoke in adapted to overlie the outer sides of the handle 6 and is provided with a cross pin 20 for latching engagement with a latch bar carried by the handle 6 and to be later described. The yoke is further notched as at 21 to engage or receive a latch plate 22, carried by a slidable latch 23 that is fixed upon the outer side of the handle 6. The cutter bar 15 is biased toward the handle 5 by a coil spring 24.

The handle 6 comprises a pair of spaced apart flat bars 25 that overlap and are pivoted to the head 11, as at 26. Pivoted between the bars 25 adjacent to the pivot 26 and slightly below the head 11, as indicated at 27, is an elongated pawl 28. The pawl 28 embodies a pair of spaced plates that are apertured at their upper ends to receive the pivot 27 and a coil spring 29, disposed upon the pivot 27 engages a stud 30 carried by and extending between the plates of the pawl at one end and the opposite end of the spring is anchored to a cross-pin 31 that extends between the bars 25. Thus, the pawl is at all times biased in a direction toward the cutter bar 15. The lower ends of the plates of the pawl are acutely angled, as at 32 and engage upon opposite sides of the bar 15 in the area of the ratchet teeth 18. The terminal ends of the plates projecting beyond the bar 15 constitute a pivotal mounting for a roller 33. The plates of the pawl adjacent to the teeth 18 have a cross-pin 34, that progressively engage the teeth 18 as the handles 5 and 6 are manipulated to actuate the co-operative jaws 12 and 16. Also extending between the plates of the pawl intermediate their length, is a latch pin 35. A latch 36, pivoted at 37 between the bars 25, is provided with a hooked end 38 that engages the pin 35 to retain the pawl 28 in a position to prevent the pin 34 from ratchet engagement with the teeth 18.

Slidable between the bars 25 of the handle 6, is a latch bar 39 that is guided by a pin 40 carried by the bars 25 and a notch 41 formed in one edge of the bar 39 rides upon the pin 40. The latch bar 39 at its upper end is pivotally connected to the latch 36 at a point spaced forwardly of the pivot 37 and whereby the upward movement of the bar 39 will rock the latch 36 out of engagement with the pin 35 to permit the pawl 28 to be biased by the spring 29 for engaging the pin 34 into the teeth 18. The bar 39 is normally biased upwardly by a spring 42, the ends of which are anchored to the bars 39 and to one of the bars 25.

The inner edge of the bar 39 is provided with an arcuate tongue 43, forming a notch 44 adapted to receive the pin 20 of the yoke 19 and the pin 20 is adapted to force the bar 39 downwardly and to shift the latch 36 into engagement with the pin 35 to lock the pawl in a position where its pin 34 is free of engagement with the teeth 18. The bar 39 at its lower end is extended outwardly of the bar 25 to form a trigger 48 and whereby the bar 39 may be rocked laterally against the tension of the spring 42 to release the pin 20 of the yoke 19 and to permit the arms 5 and 6 to be swung away from each other. The inner edge of the bar 39 is further notched at 45 and shouldered at 46 to engage a pin 47 carried by the bars 25 and constitutes a locking means for the bar 39 in its downward position and to maintain the arms against swinging movement.

The operation of the device is as follows:

With the mechanism in the position illustrated in FIGURE 1, the parts are locked together against movement by the yoke 19 and the latch bar 39 has been shifted downwardly against the tension of the spring 42 to rock the latch 36 into engagement with the pin 35 of the pawl 28, maintaining the pin 34 away from the teeth 18 and to cause the roller 33 to engage the adjacent marginal edge of the bar 15. Now, when the device is to be operated, the latch 23 is shifted downwardly, releasing the yoke and permitting the bar 15 to be biased by the spring 24 toward the arm 5. In this position, the latch 36 is still in engagement with the pin 35 of the pawl 28 and the arms are free to swing apart. As the arms 5 and 6 are swung apart after the release of the yoke 19 and the pin 34 of the pawl 28 is held away from the teeth 18 and the tool can then be manipulated by the arms 5 and 6 to cut relatively small stock by the jaws 17 and 12. When heavier stock is to be cut, the arms are swung together causing the pin 20 of the yoke 19 to engage the projecting edge 39' of the latch bar 39, shifting the latch bar from the retainer pin 47 and permitting the spring 42 to bias the arm 39 upwardly, to release the latch 36 from the pin 35 of the pawl 28, permitting the spring 29 to swing the pawl toward the bar 15 and to engage the pin 34 into the teeth 18. In such release position, the pawl is riding upon the teeth 18 and then the handles are shifted apart to provide a larger opening for the heavier stock then, as the arms are again swung together, the biting action of the jaws 12 and 17 engage the piece to be cut and the arms are progressively moved back and forth to cause a ratchet action against the arm 15 to progressively cut the work piece in a step-by-step motion of the arms. When the work piece has been completely cut through, the arms are swung together, causing the pin 20 to engage the tongue 43 and shift the bar 39 downwardly, moving the latch 36 into engagement with the pin 35 and to inactivate the pawl 28 with respect to the bar 15. In such position, the bar 39 is cause to engage the pin 47, holding the bar downwardly. The latch 23 may then be shifted upwardly to engage the notch 21, locking the mechanism together and with the arms 5 and 6 in substantially the position illustrated in FIGURE 1 which is the inactive position of the mechanism and normally employed for carrying the device to and from a point of use. When cutting small stock, the latch 36 retains the pawl 28 against swinging movement under the influence of the spring 29 but, when the stock has been cut, the arms may be swung together to release the latch bar 39 and to release the latch 36 at which time the arms may be swung outwardly a considerable distance from each other to provide a larger opening for engagement by the jaws. In the cutting of the small stock, and with the pawl being held in latched position, the roller 33 merely engages the edge of the bar 15 and the movement of the arm 5, with its pivot 14 through the bar 15, merely causes the bar to be fulcrumed downwardly without causing any ratchet action.

It will be apparent from the foregoing that a very novel mechanism has been employed to provide a cutting tool that is capable of cutting stock of varying sizes and requires little manual effort to cut the relatively thin stock, but when heavy stock such as limbs or the like that are relatively thick and possibly three inches in diameter, the device is actuated to cause the pawl to engage the ratchet teeth 18, forming a very powerful action upon the jaws 12 and 17, that is progressive as the jaws cut through the stock thus, the device is capable of cutting stock of varying diameters with a minimum of effort by the operator. The parts are unique in their assembled relation to control the movement of the jaws and the structure as illustrated is relatively simple for a tool of this character.

It is to be understood that the invention is not limited to the precise construction shown, but that changes are contemplated as readily fall within the spirit of the invention as shall be determined by the scope of the subjoined claims.

I claim:

1. A cutting tool for cutting shrubbery and tree limbs that comprises first and second elongated handles, one handle at its upper end being acutely angled to form an offset head portion that terminates in a cutting jaw, the second handle being pivotally connected to the head, a fulcrum bar that is pivotally connected to the head at the point of offset from the first named handle, the said bar terminating upwardly from its pivot to define a cutting jaw, the bar projecting downwardly from its pivot and having one edge provided with ratchet teeth, spring means for biasing the bar in a direction toward the first named handle, a pawl pivotally connected to the second handle and having its lower end bifurcated to engage the fulcrum bar, the pawl being biased toward the bar, latch means carried by the second handle for maintaining the pawl in an inoperative position, a latch carried by the second handle and a yoke carried by the bar that is engageable with the latch whereby the handles are held in inoperative position, the said latch when released permitting the handles to be swung toward and from each other for actuating the jaws to cut relatively thin stock and roller means carried by the lower end of the pawl that rides upon a free edge of the bar when the pawl is in a latched position.

2. A cutting device of the character described that comprises a pair of handles that are adapted to be moved toward and from each other, a first handle being acutely angled at its upper end to form a head portion that terminates in a cutting jaw, a second handle that is pivoted to the head portion adjacent to the cutting jaw, a fulcrum bar that is pivoted to the first handle, the bar having a co-operative cutting jaw above the point of pivoting, the bar being elongated below its pivot and with the bar on one edge being provided with ratchet teeth, the bar being biased in a direction toward the first handle, the bar at its terminal end portion being provided with a yoke, the yoke adapted to embrace the second handle and with one arm of the yoke being slotted to receive a latch plate that is slidable upon one side of the second handle whereby to maintain the handles in an inoperative position, the latch when disengaged with the yoke permitting the handles to be swung apart for moving the jaws to and from a cutting position, a pawl pivotally connected to the second handle at a point adjacent its pivot with the head, the pawl having a bifurcated end portion that embraces the cutter bar, the bifurcated end portion being provided with a roller that engages the edge of the bar, the pawl being biased toward the cutter bar by a coil spring, the bifurcated end of the pawl having a cross pin formed upon the pawl and whereby to retain the pawl in a position away from the cutter bar to prevent the engagement of the pin in the ratchet teeth and to permit the movement of the cutter bar through the bifurcated end of the pawl for engagement with the roller, a slide bar carried by the second handle and with the slide bar at its upper end being connected to the latch whereby the side bar in a lower position maintains the latch in engagement with the pin of the pawl to prevent a ratchet movement with respect to the cutter bar, the slide bar being biased in an upward direction and means carried by the yoke for forcing the slide bar downwardly to rock the latch into engagement with the pawl, the slide bar adjacent its lower end being notched to engage a stop pin carried by the second handle and whereby to maintain the slide bar in a lower position, with the latch engaging the pawl, movement of the first named latch plate permitting the yoke and the cutter bar to swing toward the first handle and for permitting the movement of the handles toward and from each other for shifting of the jaws to cut relatively thin material, a release of the slide bar causing the latch to disengage with the pawl and to permit movement of the pawl to a position where the pin engages the ratchet teeth and to permit free movement of the handles and the jaws to engage very heavy stock and to progressively move the cutter bar in a ratchet movement for progressively cutting the very heavy stock.

3. The structure according to claim 2 wherein the first and second handles are formed of a pair of elongated spaced apart plates, the head portion having a lower tail extension that is fixed between the plates of the first handle, the second handle having its plates pivoted upon opposite sides of the head, the pawl being pivotally connected between the plates of the second handle and a coil spring engaging the pivot of the pawl in a direction toward the first handle, the slide bar being slidable between the plates of the second handle, an arcuate tongue formed upon the slide bar and that engages a cross pin carried by the yoke, the slide bar being arcuately notched adjacent to the tongue whereby the pin of the yoke forces the slide bar downwardly when the handles are moved together and to swing the latch downwardly to engage the pin of the pawl, the first named latch carried by the second handle permitting the free movement of the handles apart and to maintain the pawl out of engagement with the teeth of the cutter bar, arcuate tongue of the slide bar projecting inwardly from the handle to be disposed in the line of movement of a cross pin carried by the yoke and the slide bar at its lower end being provided with a trigger that extends inwardly from the handle for the manual control of the slide bar and to permit the slide bar to be biased upwardly by a spring for releasing the latch from the pawl and to permit the pawl to be shifted toward the ratchet teeth of the cutter bar.

4. The structure according to claim 2 whereby the head is formed of a pair of spaced apart plates and with a spacer bar between the plates at the first named jaw, the cutter bar being a flat plate that is disposed between the plates of the head and with the pivot for the cutter bar extending through the plates and the bar, a retractile spring connected to the cutter bar and to the first handle whereby the cutter bar is at all times biased toward the first handle, the slide bar being additionally notched upon its outer edge to engage a pin carried by the plates of the second handle for guiding engagement of the slide bar, the slide bar on its inner edge being provided with an elongated extension that is in the line of movement of the yoke and the cross pin of the yoke to constitute a release for the slide bar when the handles are moved together and to maintain the slide bar in an upper position to maintain the latch out of engagement with the pawl.

References Cited by the Applicant
UNITED STATES PATENTS

| | | | |
|---|---|---|---|
| 179,480 | 7/1876 | Ketterman | 30—251 |
| 718,796 | 1/1903 | Rose | 30—251 |
| 1,820,169 | 9/1931 | Wigland | 30—190 X |

FOREIGN PATENTS 225,598   10/1959   Australia.

WILLIAM FELDMAN, *Primary Examiner.*

J. C. PETERS, *Assistant Examiner.*